Inventor
H. A. Shaw

Patented Dec. 22, 1942

2,306,228

UNITED STATES PATENT OFFICE 2,306,228

RATCHET WRENCH

Harold Arthur Shaw, Fond du Lac, Wis.

Application December 2, 1941, Serial No. 421,357

1 Claim. (Cl. 81—63)

The invention aims to provide an exceptionally simple and inexpensive, yet an effective and desirable ratchet wrench which is designed primarily for either tightening or loosening bicycle spokes, although not restricted to this particular field of use.

In the accompanying drawing,

Figure 1 will be considered as a plan view, and Figure 2 a bottom plan view, for purposes of description.

I have illustrated a construction which has proven to be of advantage from standpoints of manufacture and use, and while said construction will be specifically described, it is to be understood that minor variations may be made within the scope of the invention as claimed.

Figure 2:
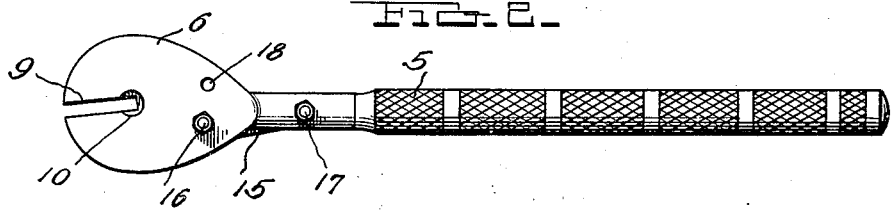
Figure 3:
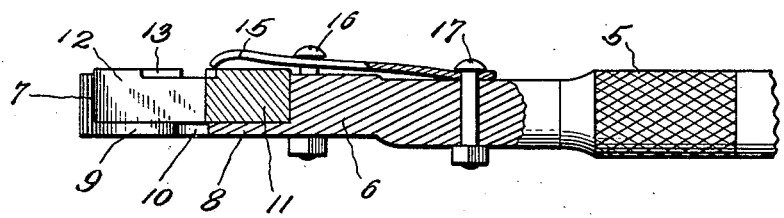
Figure 3 is an enlarged longitudinal sectional view on line 3—3 of Figure 1.
Figure 4:
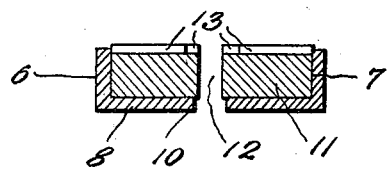
Figure 4 is an enlarged transverse sectional view on line 4—4 of Figure 1.

A suitable elongated handle 5 is provided, the front end of said handle having a flat ovate head 6. This head is formed with a cylindrical socket 7 which opens through one of its flat sides, leaving a thin wall 8 between said socket and the other flat side of the head. A slot 9 extends radially of the socket 7, opens through the top and bottom surfaces of the wall 8, and opens through the periphery of the head 6, the inner extremity of said slot being preferably arranged somewhat as shown more particularly at 10 in Figs. 2 and 3.

A flat cylindrical disk 11 lies within the socket 7 upon the wall 8, the peripheral edge of said disk being in contact with the peripheral wall of said socket. This disk is formed with a slot 12 extending from its center through its periphery and adapted for registration with the slot 9 of the head 6 when the usual threaded sleeve of a bicycle spoke, or other member to be rotated, is to be engaged with said slot 12 or disengaged therefrom. Then, as the disk 11 is rotated, the sleeve or other member engaged with the slot, will be forcibly turned.

Figure 1:
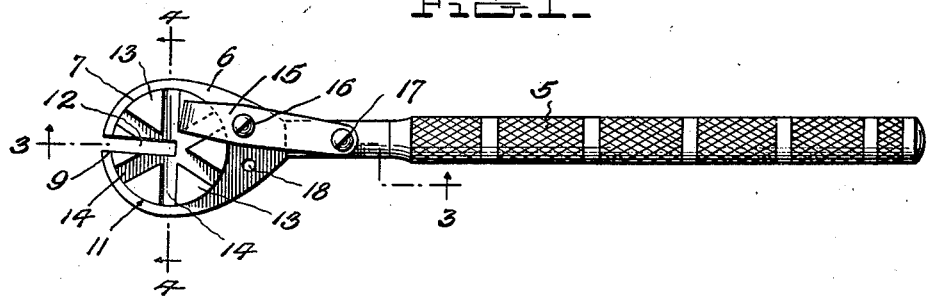

The upper side of the disk 11 is formed with a plurality of ratchet teeth 13, said ratchet teeth being preferably of the triangular form shown in Fig. 1 in order that they may be formed simply by cutting intersecting diametrical grooves 14 in the disk. These ratchet teeth are cooperable with a spring pawl 15 which overlies the head 6 and the adjacent portion of the handle 5, said pawl being secured to said head by a bolt 16 and secured to said handle by a bolt 17. It will be understood that the parts 16 and 17 may be rivets or other suitable fastenings. The pawl 15 yieldably presses downwardly upon the ratchet teeth 13 to hold the disk 11 in the socket 7, and when the disk is engaged with the work, oscillation of the handle 5 and its head 6 causes said pawl to cooperate with the ratchet teeth 13 in turning the disk 11. When tightening a bicycle spoke sleeve or other member, the wrench is used one side up, and for loosening, it is simply turned over. If desired, however, a second opening 18 may be formed in the head 6 to receive the bolt 16, should it be desired to swing the pawl 15 to a position in which it would reversely drive the disk 11, while permitting the unencumbered lower side of said head to lie next to the work.

From the foregoing taken in connection with the accompanying drawing, it will be seen that novel and advantageous provision has been made for carrying out the object of the invention, and attention is again invited to the possibility of making variations within the scope of the invention as claimed.

I claim:

A wrench comprising a handle having a flat head at its front end, said head having a cylindrical socket opening through one of its flat sides and leaving a wall between said socket and the other flat side of the head, said head also having a slot extending from the central portion of said wall through the peripheral edge of said head and opening through opposite sides of said wall, a flat cylindrical disk lying rotatably in said socket upon said wall and having a slot from its central portion through its peripheral edge, the disk slot being adapted to register with the head slot when a member is to be engaged with the inner end of said disk slot or removed therefrom, the outer side of said disk being provided with ratchet teeth, a spring pawl cooperable with said ratchet teeth for turning said disk when said head is oscillated by means of said handle, and means securing said spring pawl to said head in position to exert pressure on said disk to hold the latter in said socket.

HAROLD ARTHUR SHAW.